US008340722B2

(12) United States Patent
Zhu et al.

(10) Patent No.: US 8,340,722 B2
(45) Date of Patent: Dec. 25, 2012

(54) AUTO-ACCELERATED METHOD FOR A MOBILE COMMUNICATION EQUIPMENT AND THE EQUIPMENT THEREFORE

(75) Inventors: Xing-Guo Zhu, Nanjing (CN); James Cao, Nanjing (CN)

(73) Assignees: Inventec Appliances (Pudong) Corporation, Shanghai (CN); Inventec Appliances Corp., Taipei Hsien (TW); Inventec Appliances (JiangNing) Corporation, Nanjing (CN)

( * ) Notice: Subject to any disclaimer, the term of this patent is extended or adjusted under 35 U.S.C. 154(b) by 398 days.

(21) Appl. No.: 12/837,498

(22) Filed: Jul. 16, 2010

(65) Prior Publication Data
US 2011/0014950 A1 Jan. 20, 2011

(30) Foreign Application Priority Data
Jul. 17, 2009 (CN) .......................... 2009 1 0160793

(51) Int. Cl.
*H04B 1/38* (2006.01)
(52) U.S. Cl. .................. 455/558; 455/550.1; 455/556.1; 455/440; 455/441; 455/424; 455/557; 705/71; 257/685; 257/720
(58) Field of Classification Search .................. 455/558, 455/557, 556.1, 424, 550.1, 440, 441
See application file for complete search history.

(56) References Cited

U.S. PATENT DOCUMENTS

| | | | | |
|---|---|---|---|---|
| 7,088,294 | B2 * | 8/2006 | Qi et al. | 343/702 |
| 7,278,017 | B2 * | 10/2007 | Skantze | 713/168 |
| 7,383,087 | B2 * | 6/2008 | Hoyme et al. | 607/27 |
| 7,408,786 | B2 * | 8/2008 | Lowles et al. | 361/760 |
| 7,612,726 | B2 * | 11/2009 | Qi et al. | 343/702 |
| 7,684,212 | B2 * | 3/2010 | Lowles et al. | 361/807 |
| 7,812,860 | B2 * | 10/2010 | King et al. | 348/210.99 |
| 7,853,242 | B2 * | 12/2010 | Lewis et al. | 455/411 |
| 7,957,895 | B2 * | 6/2011 | Haase | 701/426 |

* cited by examiner

*Primary Examiner* — Marceau Milord
(74) *Attorney, Agent, or Firm* — CKC & Partners Co., Ltd.

(57) ABSTRACT

An auto-accelerated method is applied to a mobile communication equipment. The mobile communication equipment includes a primary module and a secondary module with a specific communication pattern including a transmission interface. The primary module sends out an inquiry command to inquire the transmission interface corresponding to the secondary module. The secondary module sends out a reply command to answer the inquiry command. According to the reply command, the primary module turns a switch inside the primary module to reach a transmission unit corresponding to the transmission interface of the secondary module. After the switching, the data transmission is made through between the primary module and the secondary module.

17 Claims, 5 Drawing Sheets

AUTO-ACCELERATED METHOD FOR A MOBILE COMMUNICATION EQUIPMENT AND THE EQUIPMENT THEREFORE

RELATED APPLICATIONS

This application claims priority to China Application Serial Number 200910160793.2, filed Jul. 17, 2009, which is herein incorporated by reference.

FIELD OF INVENTION

The present invention relates to a mobile communication equipment. More particular, the present invention relates to a card-based mobile communication equipment which aims for improving transmission efficiency between a primary module and a secondary module.

BACKGROUND ART

A card-based mobile phone has a communication card with a communication module. The mobile phone itself only has a processing module which is used for processing data, and it has no communication interface. When the communication card is combined with the mobile phone, the communication module is coupled to the processing module in order to transmit data to each other. The mobile phone is capable of communicating via the communication card.

Each kind of communication card has a transmission interface of different transmission and communication speed, but successful communication and data processing are only feasible while the communication module in a card-based mobile phone and the processing module share the same transmission interface.

In other words, if either of the communication module and the processing module has a high speed transmission interface, the communication module and the processing module will transmit data to each other at a high speed after the communication card is inserted into the mobile phone. If the communication module has a high speed transmission interface while the processing module has a low speed transmission interface or, on the contrary, the processing module has a high speed transmission interface while the communication module has a low speed transmission interface, in order to transmit data between the communication module and the processing module successfully, the card-based mobile phone will have to be switched to low speed transmission interface manually by user. After that, the communication module and processing module will transmit data to each other at a low speed.

However, every communication card has its own transmission interface, which causes that the user has to check the transmission interface of the communication card when the card is inserted into the mobile phone. Furthermore, the user has to be aware of the transmission interface of the mobile phone so as to select corresponding transmission interface properly, and then manually select transmission interface. This is really inconvenient.

Even the communication card has the high speed transmission interface, data exchange is still carried out at a low speed because the mobile phone only has the low speed transmission interface. Hence, the overall performance of the card-based mobile phone is reduced, especially more apparent in communication speed.

For this purpose, the present invention provides an auto-accelerated method suited for a mobile communication equipment thereby improving the abovementioned problems by enabling the mobile communication equipment to switch itself automatically to a transmission interface corresponding to different transmission interfaces.

SUMMARY OF THE INVENTION

In one aspect, the present invention is directed to a mobile communication equipment and a method for automatically accelerating data transmission speed thereof.

The present invention is related to a mobile communication equipment corresponding to at least one kind of specific communication pattern comprises a secondary module and a primary module. The secondary module comprises a second connector which at least comprises a second instruction transmission pin and a second data transmission pin. The second connector is capable of transmitting with a specific transmission speed.

The primary module comprises a first connector, a processing unit and a switching unit. The first connector is connected to the processing unit and the switching unit is respectively connected to the first connector and the processing unit. The first connector at least comprises a first instruction transmission pin and a first data transmission pin. The first instruction transmission pin is connected to the second instruction transmission pin while the first data transmission pin is connected to the second data transmission pin.

When the secondary module is connected to the primary module, the processing unit transmits an inquiry instruction to the secondary module, and then the secondary module replies the inquiry instruction with transmitting a reply instruction comprising the transmission information of the second connector to the processing unit.

The switching unit comprises a plurality of transmission units with different transmission speeds. The switching unit switches to the transmission unit corresponding to the secondary module according to the transmission speed of the secondary module so that the subsequent data is able to be transmitted between the processing unit and the secondary module via the first data transmission pin and the second data transmission pin.

Therefore, by using the mobile communication equipment and the method for automatically accelerating data transmission speed thereof to enable the mobile communication equipment of sensing transmission between the primary module and the secondary module, then automatically switched to the matched transmission unit. In this manner, when the speed of the secondary module changes, the primary module adjusts simultaneously to search for the most appropriate transmission interface to enhance the data transmission efficiency between the primary module and the secondary module in the mobile communication equipment.

Reference is made to appended drawings to describe the advantages and spirits of the present invention.

BRIEF DESCRIPTION OF THE DRAWINGS

These and other features of the invention will become more apparent from the following description in which reference is made to the appended drawings, wherein.

PREFERRED EMBODIMENTS OF THE INVENTION

Figure 1:
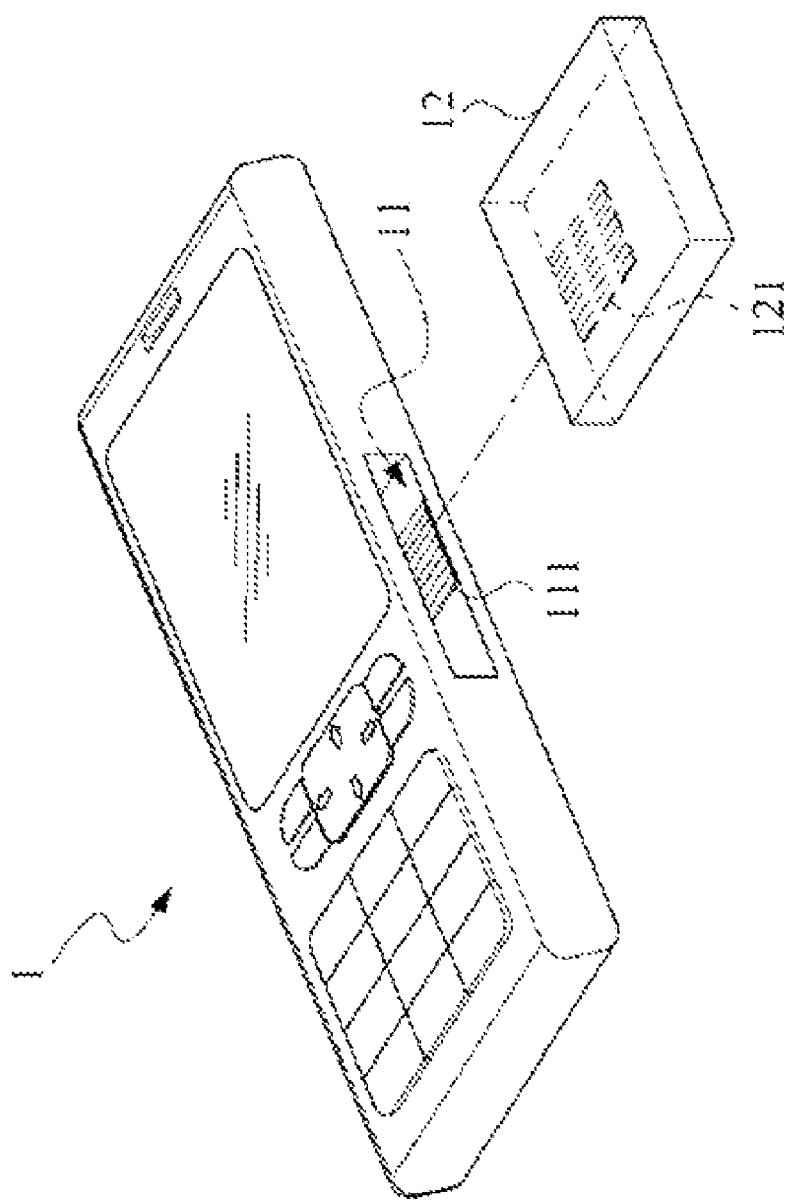
FIG. 1 is a schematic drawing illustrating the mobile communication equipment according to one embodiment of the invention.
Figure 2:
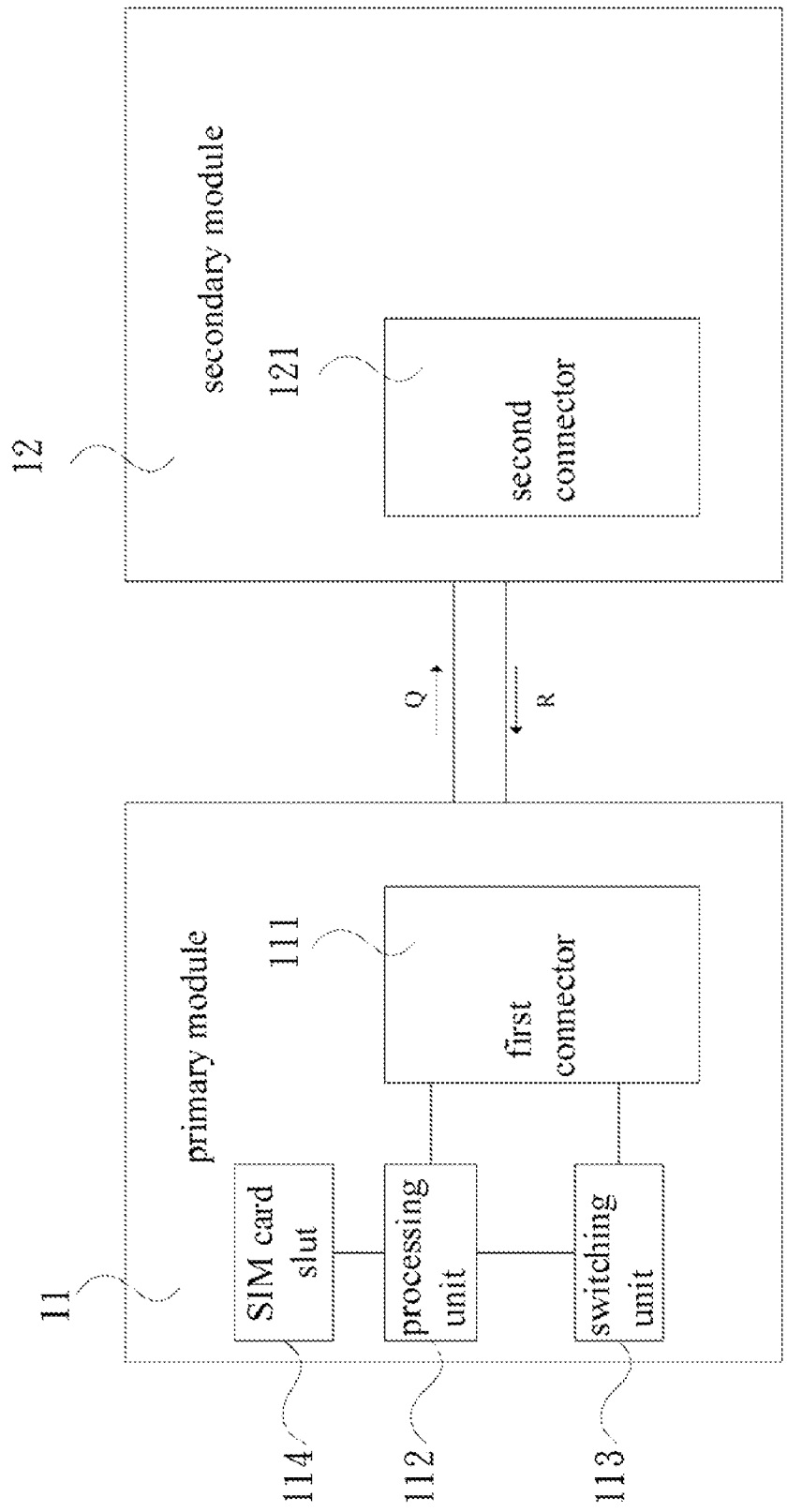
FIG. 2 is a structure schematic drawing illustrating the mobile communication equipment and the method for automatically accelerating data transmission speed thereof according to one embodiment of the invention.

Please refer to FIG. 1 and FIG. 2. FIG. 1 is a schematic drawing illustrating a mobile communication equipment according to one embodiment of the invention. FIG. 2 is a structure drawing illustrating a mobile communication equipment according to one embodiment of the invention. The mobile communication equipment 1 comprises a primary module 11 and a secondary module 12. The primary module 11 comprises a first connector 111, a processing unit 112 and a switching unit 113. The secondary module 12 comprises a second connector 121. The processing unit 112 is respectively connected to the switching unit 113 and the first connector 111, and the first connector 111 is connected to the second connector 121. Hence, the primary module 11 is connected to the secondary module 12 via the first connector 111 and the second connector 121.

The mobile communication equipment 1 further comprises a SIM card slut 114 to be inserted a SIM card. The secondary module 12 refers to, for example, a card secondary module comprising a high speed or a low speed transmission interface which is capable of communicating. The mobile communication equipment 1 could be a card-based mobile phone. When the card secondary module is inserted into the card-based mobile phone, the primary module 11 is connected to the secondary module 12.

Upon the secondary module 12 connecting to the primary module 11, the processing unit 112 transmits an inquiry instruction Q to the secondary module 12. The inquiry instruction Q aims to inquiry the transmission interface the secondary module 12 has. When the secondary module 12 receives the inquiry instruction Q, a reply instruction R is transmitted from the secondary module 12 to the processing unit 112. The reply instruction R is used for replying the inquiry instruction Q and informing the processing unit 112 of the transmission interface the secondary module 12 has. After processing unit 112 receives the reply instruction R, the switching unit 113 switches to a transmission interface corresponding to the secondary module 12. For example, assuming the secondary module 12 has a high speed transmission interface, the reply instruction R will inform the processing unit 112 of that the secondary module 12 has a high speed transmission interface, then the switching unit 113 will switch to a high speed transmission unit 1131a in order to connect the secondary module 12 and the primary module 11 with a high speed transmission interface. If the secondary module 12 supports both high speed and low speed transmission interfaces, it will be switched to high speed transmission interface, which means the reply instruction R will inform the processing unit 112 of that the secondary module 12 has a high speed transmission interface. In this way, the best efficiency is achieved. The above inquiry instruction Q and the reply instruction R are both a kind of attention (AT) instruction.

Figure 3:
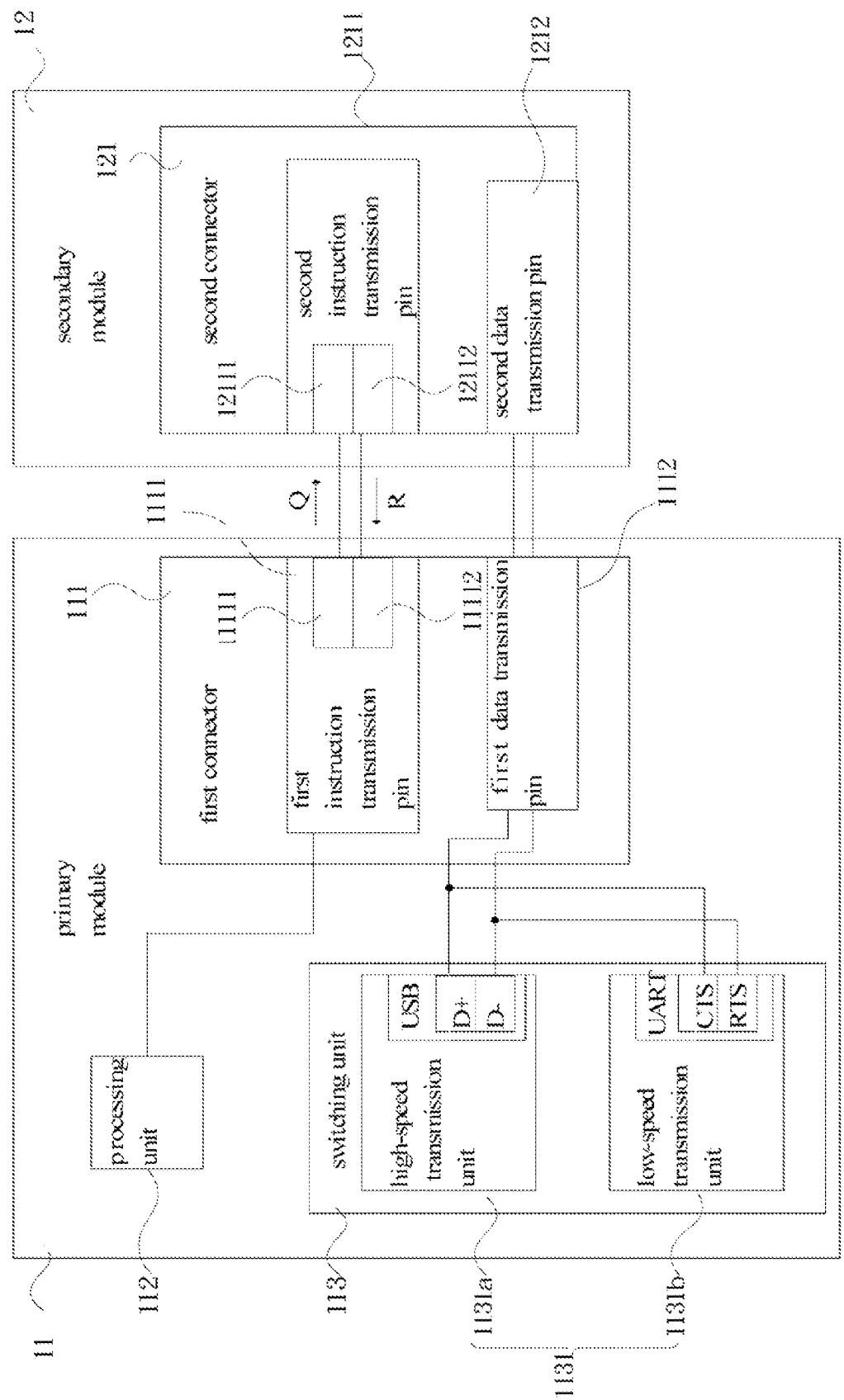
FIG. 3 is a schematic drawing illustrating the detail connection of the mobile communication equipment according to one embodiment of the invention.

Please refer to FIG. 3. FIG. 3 is a schematic drawing illustrating the detail connection of the mobile communication equipment according to one embodiment of the invention. As shown in FIG. 3, the first connector 111 comprises at least a first instruction transmission pin 1111 and a first data transmission pin 1112. The second connector 121 comprises at least a second instruction transmission pin 1211 and a second data transmission pin 1212. Wherein, the first instruction transmission pin 1111 is connected to the second instruction transmission pin 1211. The first data transmission pin 1112 is connected to the second data transmission pin 1212.

The first instruction transmission pin 1111 further comprises a first TXD pin 11111 and a first RXD pin 11112. The second instruction transmission pin 1211 further comprises a second TXD pin 12111 and a second RXD pin 12112. The first TXD pin 11111 is connected to the second TXD pin 12111. The first RXD pin 11112 is connected to the second RXD pin 12112. The above mentioned inquiry instruction Q is transmitted from the processing unit 112 to the second instruction transmission pin 1211 via the first TXD pin 11111 and the second TXD pin 12111. The reply instruction R is transmitted to the processing unit 112 via the first RXD pin 11112 and the second RXD pin 12112.

In this embodiment, two transmission units 1131 with different transmission speeds are used as illustrations. The switching unit 113 internally comprises a high speed transmission unit 1131a and a low speed transmission unit 1131b, both of which are connected to the processing unit 112. The high speed transmission unit 1131a refers to a D+ transmission unit and a D− transmission unit in the USB protocol. The low speed transmission unit 1131b refers to a RTS transmission unit and a CTS transmission unit in the UART protocol. When the secondary module 12 and the primary module 11 connect with a high speed transmission interface, information and data will be transmitted via the D+ transmission unit and the D− transmission unit. When the secondary module 12 and the primary module 11 connect with a low speed transmission interface, information and data will be transmitted via the RTS transmission unit and the CTS transmission unit in the UART protocol. The above mentioned D+ transmission unit, D− transmission unit and RTS transmission unit, CTS transmission unit are two respective pin series. The first data transmission pin 1112 is connected to the second data transmission pin 1212 via the two pin series.

Figure 4:
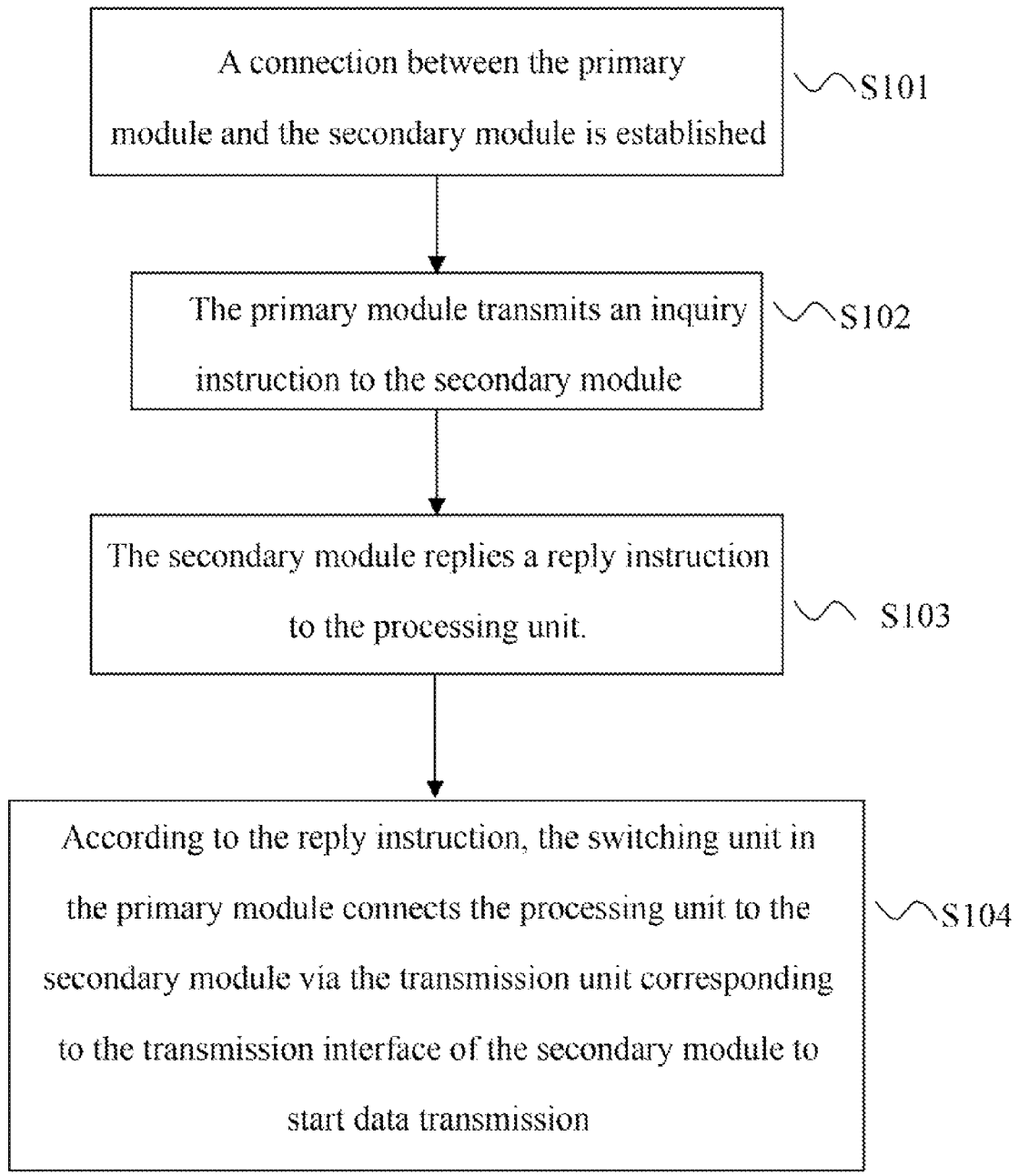
FIG. 4 is a block diagram illustrating the method for automatically accelerating data transmission speed according to one embodiment of the invention.

In order to explicate the mobile communication equipment and the method for automatically accelerating data transmission speed thereof, please further refer to FIG. 4, FIG. 4 is a block diagram illustrating the method for automatically accelerating data transmission speed according to one embodiment of the invention. The method is provided to the mobile communication equipment 1 to switch the transmission interfaces. Steps and explication as follows:

First, establish a connection between the primary module 11 and the secondary module 12 (S101). Afterwards, a Handshake is executed between the secondary module 12 and the primary module 11 via the first RXD pin 11112 and the second RXD pin 12112.

The primary module 11 transmits an inquiry instruction Q to the secondary module 112 (S102). The processing unit 112 transmits the inquiry instruction Q via the first TXD pin 11111 of the primary module 11 and the second TXD pin 12111 to the secondary module 12. The inquiry instruction Q aims to inquiry the transmission interface the secondary module 12 has.

The secondary module 112 replies a reply instruction R to the processing unit 112. The reply instruction R comprises the information of the transmission interface the secondary module 112 has (S103). The secondary module 12 transmits the reply instruction R comprising the information of the transmission interface the secondary module 12 has to the processing unit 112 via first data transmission pin 1112 and the second data transmission pin 1212 to the respond the inquiry instruction Q by informing the processing unit 112 of the present transmission interface of the transmission speed the secondary module 12 has.

According to the reply instruction R, the switching unit 113 in the primary module 11 connects the processing unit 112 to the secondary module 12 via the transmission unit 1131 corresponding to the transmission interface of the secondary module 12 to start data transmission (S104). The switching unit 113 switches to the corresponding high speed transmission unit 1131a or the low speed transmission unit 1131b according to the information of the reply instruction R.

Figure 5:
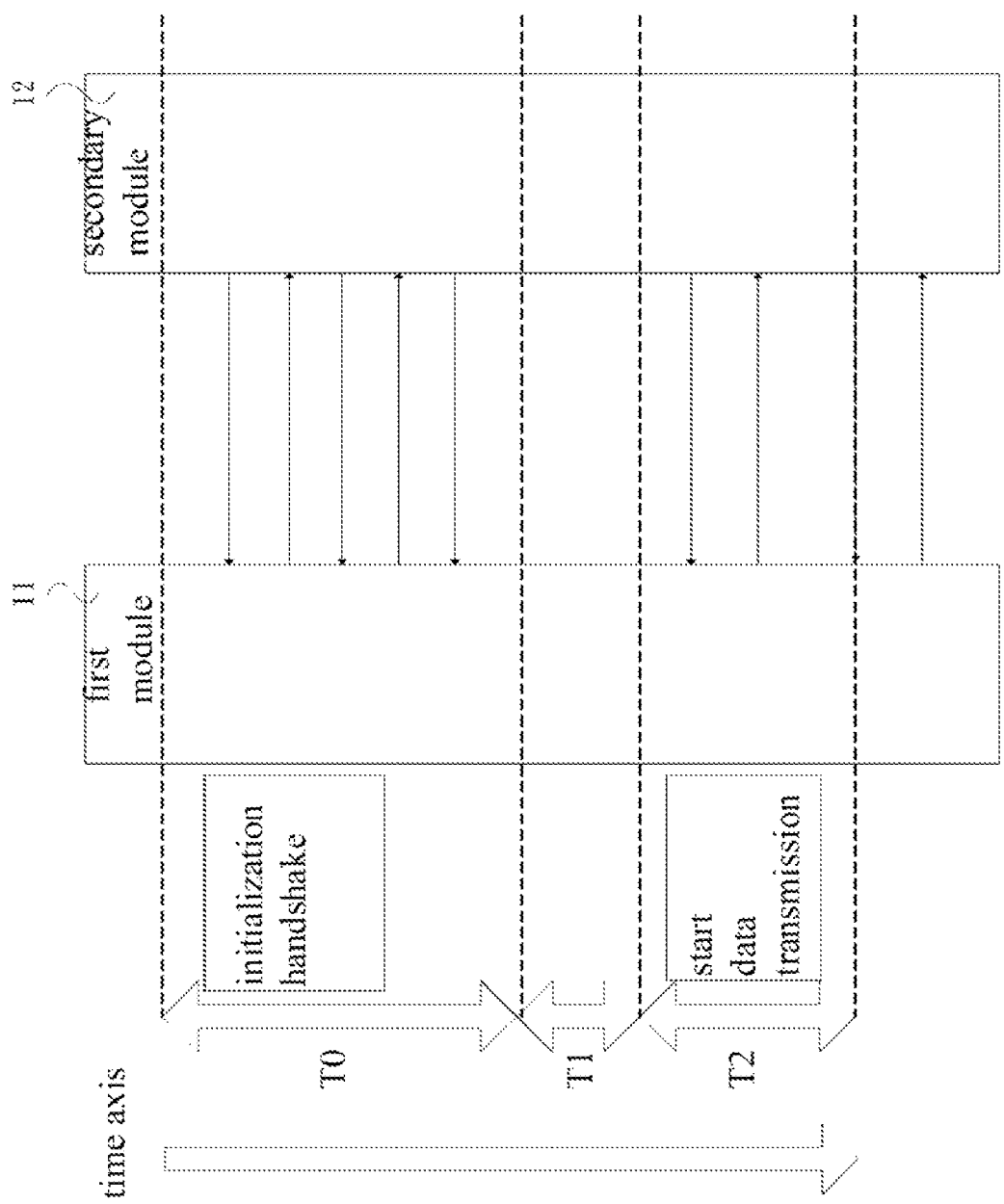
FIG. 5 is a time sequence drawing illustrating the mobile communication equipment and the method for automatically accelerating data transmission speed thereof according to one embodiment of the invention.

Please refer to FIG. 5. FIG. 5 is a time sequence drawing illustrating the mobile communication equipment and the method for automatically accelerating data transmission speed thereof according to one embodiment of the invention. The time axis in this fig points down, the upper area represents past and the lower the closer to present. At time $T_0$, the primary module 11 and the secondary module 12 are initialized first and then the primary module 11 transmits the inquiry instruction Q which in this fig is some instructions of AT instruction set. The primary module 11 transmits AT+IPR to inquiry the transmission interface the secondary module 12 has. The secondary module 12 reply +IPR: 9600, 38400 . . . <LF><CR>OK, which means the secondary module 12 support the transmission speed of 9600 or 38400. Afterwards the primary module 11 transmits AT+IPR=38400 to notify the secondary module 12 to apply the transmission speed of 38400. The secondary module 12 relies OK as confirmation. After initialization the Handshake is executed. After that, await a time period of $T_1$, at time $T_2$, the primary module 11 transmits an AT instruction to inquiry the secondary module 12 whether the Handshake is successful. The secondary module 12 replies OK to confirm that the Handshake is completed. Then the primary module 11 goes on transmitting AT+GCAP? to inquiry the card type of the secondary module 12. The secondary module 12 replies AT+GCAP=Card type. If the card type is +GSM, that means the secondary module 12 is a GSM system card. Afterwards the steps of the abovementioned method for automatically accelerating data transmission speed are started. The AT instructions used above are only explanatory which is not used to limit the method for automatically accelerating data transmission speed.

Thus, by using the mobile communication equipment and the method for automatically accelerating data transmission speed thereof provided by present invention, the transmission unit between the primary module and the secondary module is automatically switched. The primary module is able to read the data in the secondary module at a high speed. Hence, the transmission interfaces of the primary module and the secondary module in the mobile communication equipment are improved, which enhances the transmission speed of the mobile communication equipment. In one word, the present invention provides high efficiency mobile communication equipment to the user.

It will be understood that the above description of embodiments is given by way of example only. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile communication equipment, comprising:
a primary module, comprising a first connector, a processing unit and a switching unit, wherein the first connector at least comprises a first instruction transmission pin and a first data transmission pin, the processing unit is respectively connected to the first instruction transmission pin and the switching unit, the switching unit connected to the first data transmission pin comprises a plurality of transmission units with different transmission speeds; and
a secondary module connected to the primary module and comprising a second connector capable of transmitting with a specific transmission speed, wherein the second connector comprises a second instruction transmission pin corresponding to the first instruction transmission pin and a second data transmission pin corresponding to the first data transmission pin;
wherein, when the primary module is connected to the secondary module, the processing unit transmits an inquiry instruction to the secondary module for inquiring into the specific transmission speed of a transmitting from the secondary module; the secondary module then transmits a reply instruction for responding the specific transmission speed of the transmitting from the secondary module; the switching unit switches to one of the transmission units thereof with which the transmission speed matches the specific transmission speed of the transmitting from the secondary module according to the reply instruction.

2. The mobile communication equipment according to claim 1, wherein at least one of the transmission unit is a Request To Send (RTS) transmission unit and a Clear To Send (CTS) transmission unit in accordance with the Universal Asynchronous Receiver/Transmitter (UART) protocol.

3. The mobile communication equipment according to claim 1, wherein at least one of the transmission unit is a D+ transmission unit and a D− transmission unit in accordance with the Universal Serial BUS (USB) protocol.

4. The mobile communication equipment according to claim 1, wherein the secondary module is a card communication module, and the mobile communication equipment is a card-based mobile phone.

5. The mobile communication equipment according to claim 1, the first instruction transmission pin further comprising a first Transmit Data (TXD) pin and a first Receive Data (RXD) pin, the second instruction transmission pin further comprising a second TXD pin and a second RXD pin, wherein the inquiry instruction is transmitted from the processing unit to the secondary module via the first TXD pin and the second TXD pin, the reply instruction is transmitted from the secondary module to the processing unit via the first RXD pin and the second RXD pin.

6. The mobile communication equipment according to claim 5, wherein the secondary module is initialized after the processing unit is booted and before the inquiry instruction is transmitted, afterwards, a Handshake is executed between the secondary module and the processing unit via the first RXD pin and the second RXD pin.

7. The mobile communication equipment according to claim 1, wherein a subscriber identity module (SIM) card is inserted into the primary module to be connected to the secondary module via the first connector and the second connector.

8. The mobile communication equipment according to claim 1, wherein the inquiry instruction and the reply instruction are both a kind of attention (AT) instruction.

9. An auto-accelerated method suited for a mobile communication equipment for automatically accelerating a data transmission speed between a primary module and an secondary module which is capable of transmitting with a specific speed, the auto-accelerated method comprising:

establishing a communication connection between the primary module and the secondary module;

transmitting an inquiry instruction from the primary module to the secondary module;

transmitting a reply instruction comprising transmission information of the secondary module to a processing unit of the primary module; and connecting the processing unit and the secondary module via a transmission unit corresponding to the transmission information of the secondary module by a switching unit of the primary module according to the reply instruction.

10. The auto-accelerated method according to claim 9, wherein the secondary module corresponding to at least one kind of specific communication pattern is a card secondary module, and the mobile communication equipment is a card-based mobile phone.

11. The auto-accelerated method according to claim 9, wherein the processing unit is connected to a second Transmit Data (TXD) pin and a second Receive Data (RXD) pin of the secondary module via a first TXD pin and a first RXD pin, and the method further comprises:

transmitting the inquiry instruction from the processing unit to the secondary module via the first TXD pin and the second TXD pin; and transmitting the reply instruction from the secondary module to the processing unit via the first RXD pin and the second RXD pin.

12. The auto-accelerated method according to claim 11, before the inquiry instruction is transmitted, further comprising:

booting the mobile communication equipment;
initializing the secondary module; and
executing a Handshake between the secondary module and the processing unit.

13. The auto-accelerated method according to claim 9, wherein the transmission unit is a Request To Send (RTS) transmission unit and a Clear To Send (CTS) transmission unit in accordance with the Universal Asynchronous Receiver/Transmitter (UART) protocol.

14. The auto-accelerated method according to claim 9, wherein the transmission unit is a D+ transmission unit and a D− transmission unit in accordance with the Universal Serial Bus (USB) protocol.

15. The auto-accelerated method according to claim 9, wherein a subscriber identity module (SIM) is inserted into the primary module to be connected to the secondary module.

16. The auto-accelerated method according to claim 9, wherein in the step of connecting the processing unit and the secondary module, the transmission speed of the transmission unit is in accordance with the transmission speed of the secondary module.

17. The auto-accelerated method according to claim 9, wherein the inquiry instruction and the reply instruction are both a kind of attention (AT) instruction.

* * * * *